(No Model.)

E. & C. K. DAVIS.
BICYCLE BRAKE.

No. 590,700. Patented Sept. 28, 1897.

Witnesses:
F. W. Woerner.
L. A. Minturn.

Inventors,
Emerson Davis and
Clarence K. Davis,
by Joseph A. Minturn
ATTORNEY.

THE NORRIS PETERS CO., PHOTO-LITHO., WASHINGTON, D. C.

UNITED STATES PATENT OFFICE.

EMERSON DAVIS AND CLARENCE K. DAVIS, OF INDIANAPOLIS, INDIANA; SAID EMERSON DAVIS ASSIGNOR TO SAID CLARENCE K. DAVIS.

BICYCLE-BRAKE.

SPECIFICATION forming part of Letters Patent No. 590,700, dated September 28, 1897.

Application filed October 17, 1896. Serial No. 609,173. (No model.)

*To all whom it may concern:*

Be it known that we, EMERSON DAVIS and CLARENCE K. DAVIS, citizens of the United States, residing at Indianapolis, in the county of Marion and State of Indiana, have invented certain new and useful Improvements in Bicycle-Brakes; and we do hereby declare the following to be a full, clear, and exact description of the invention, such as will enable others skilled in the art to which it appertains to make and use the same.

This invention relates to bicycle-brakes in which an elastic roller is brought into contact with the tire of the wheel and is forced by the pressure thus exerted on it against a hood of some unyielding material within which the roller is mounted; and the object of the invention is to provide a construction in which mud and gravel cannot work in between the roller and the hood, so as to interfere with its efficiency, and in which the brake will be more sensitive in its action than has been attained heretofore with the use of friction-rollers for brakes.

The object also is to improve the method of fastening the brake to the bicycle-frame and the means for holding the brake away from the tire when it is not in use.

We accomplish the objects of the invention by the mechanism illustrated in the accompanying drawings, in which—

Figure 1:
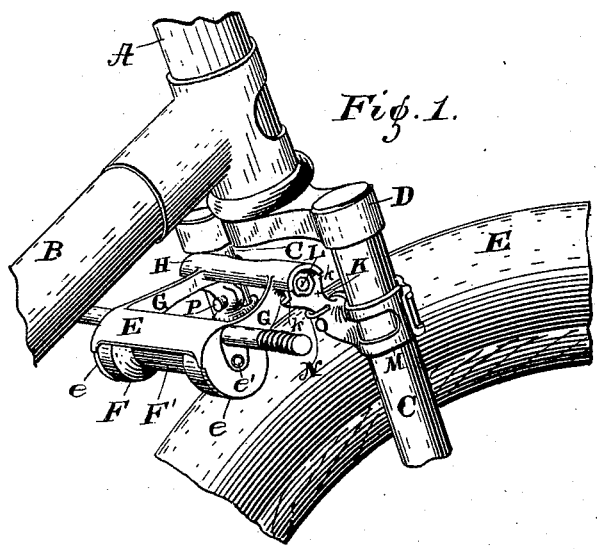
Figure 2:
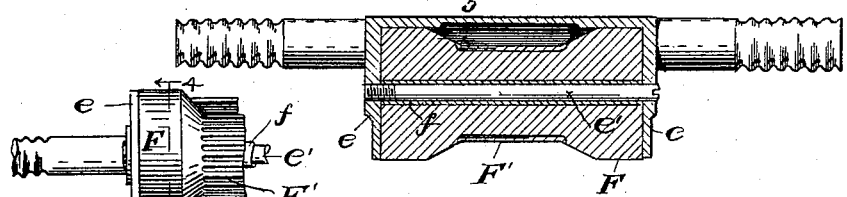
Figures 3, 4:
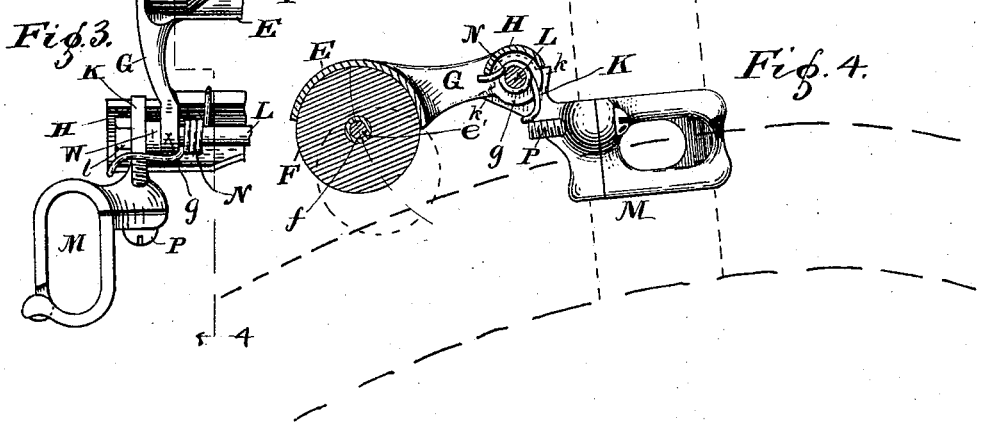
Figure 5:

Figure 1 is a view in perspective of our improved brake as applied to a bicycle. The view shows a portion of the frame of the bicycle and part of the rim and tire of the front wheel. Fig. 2 is a longitudinal section through the elastic roller and the hood surrounding the roller. Fig. 3 is an under side view of a portion of the brake. Fig. 4 is a vertical section on the line 4 4 of Fig. 3, and Fig. 5 is a detail showing the link-joint for connecting the two parts of the clamp together.

Similar letters of reference indicate like parts throughout the several views of the drawings.

A is the front frame-tube, B the lower main tube, C the two sides of the front fork, D the crown connecting the two sides of the front fork, and E the pneumatic tire of the bicycle-wheel, all of usual construction.

F is an elastic roller, preferably rubber, having a spool-like shape in which the ends are of greater diameter than its middle portion.

E is a hood within which the roller is mounted. The ends *e* of the hood are parallel and circular in form and are a distance apart equal to the length of the roller. A pin *e'* connects these ends of the hood, and it is upon this pin that the roller is mounted. The roller is provided with the bushing *f* to take the friction of the elastic material of the roller off of the spindle on which it turns. This bushing will preferably be of metal. The hood E is adjustably secured above the tire of the bicycle-wheel in a manner which will be hereinafter described, but the feature of greatest importance in this invention is the relation of the roller to the hood, in that the rubber roller has a primary circumferential contact with the hood or housing and contact at all times also with the ends of the hood. By this construction when the brake is applied the rubber is forced into the corner of the hood and there is no escape by bulging out in any direction. Hence great friction is obtained on the instant of the application of the brake. The hood is open along its under side to allow the roller to contact with the tire when it is brought down in applying the brake.

In order to increase the friction between the roller and the tire, especially when the tire is wet and more apt than at other times to slip, we provide a series of longitudinal ridges F', which produce a corrugated surface around the reduced portion of the roller.

We will now describe the method and means whereby the roller and its hood are secured to the forks of the bicycle.

G are two arms cast integrally with the hood and terminating at their outer ends with the housing H, which also forms an integral part of the same casting as the hood and arms. The housing H is concave on its under side and has the arms G continued across to form lugs or ears *g* for a hinge-joint. The opposite ears K of this hinge are integral with clamps M, which are fastened to the front forks of the bicycle. The ears *g* and K are united by means of the pin L in the manner as will be clearly understood from the drawings.

N are a pair of spiral springs, the coils of which are wound around the pin L. One end of the spring is made to bear against the edge of the housing and the other end of the spring is caught around the ears K, whereby the hood E and the roller connected with it are held away from the tire of the bicycle-wheel by the springs.

The clamps M are two in number, one for each side of the front fork, and they are each made up of two pieces removably secured to each other. The two parts are joined together at one place by means of a hook and eye similar in construction to the joint commonly employed in a link belt. As shown in Fig. 5, $m$ is the hook, and $m'$ the post of the eye into which the hook is caught. The opposite ends are united by means of the screw P, by means of which the two parts of the clamp, after they have been placed around the side of the front fork, will be drawn together with sufficient force to hold them in place and thereby lock the brake at the desired height on the said forks.

The ears K have the lugs $k$ on each side, which form stops to regulate the movement of the roller.

As the sides C of the front fork are not always the same distance apart, we use the washers W around the pin L. We place these washers between the ears $g$ and K when it is necessary to increase the distance between the clamps for a wide fork, and when the forks are close together we place the washers on the outside of both ears. The ends of the pin are threaded and are held in place by the nuts $l$.

We are aware that elastic rollers have been used for brakes and that washers have been interposed between the ends of the rollers and their supports, but so far as we are aware we are the first to provide direct friction between a revolving rubber roller and the ends of the hood and to provide a construction in which the roller has primitive contact and friction with the top of the hood, and therefore

We claim—

The combination, with a bicycle-frame, and the wheel of a bicycle, of a casing secured to said frame, said casing being cylindrical in form and having closed ends and a closed upper portion, a spindle mounted in the ends of said casing, and a roller of elastic material, as rubber, having an annular recess with outwardly flaring or tapering sides following the contour of the bicycle-tire in section, and being mounted on said spindle snugly between the ends of the casing and in close proximity to the bicycle-tire, said roller also fitting at its terminal upper portions snugly against the upper portion of the casing, substantially as described.

In testimony whereof we affix our signatures in presence of two witnesses.

EMERSON DAVIS.
CLARENCE K. DAVIS.

Witnesses:
JOSEPH A. MINTURN,
F. W. WOERNER.